June 15, 1965  G. C. FROST ETAL  3,188,865
INTEGRATED APPARATUS FOR MEASURING THE LEVEL OF LIQUIDS
Filed Aug. 1, 1962  2 Sheets-Sheet 1

INVENTORS
GERARD C. FROST
JOHN P. GRYNKIEWICZ

ATTORNEY

June 15, 1965 G. C. FROST ETAL 3,188,865
INTEGRATED APPARATUS FOR MEASURING THE LEVEL OF LIQUIDS
Filed Aug. 1, 1962 2 Sheets-Sheet 2
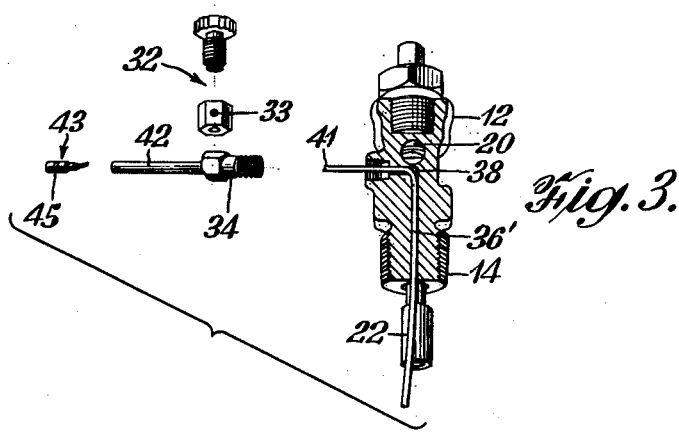
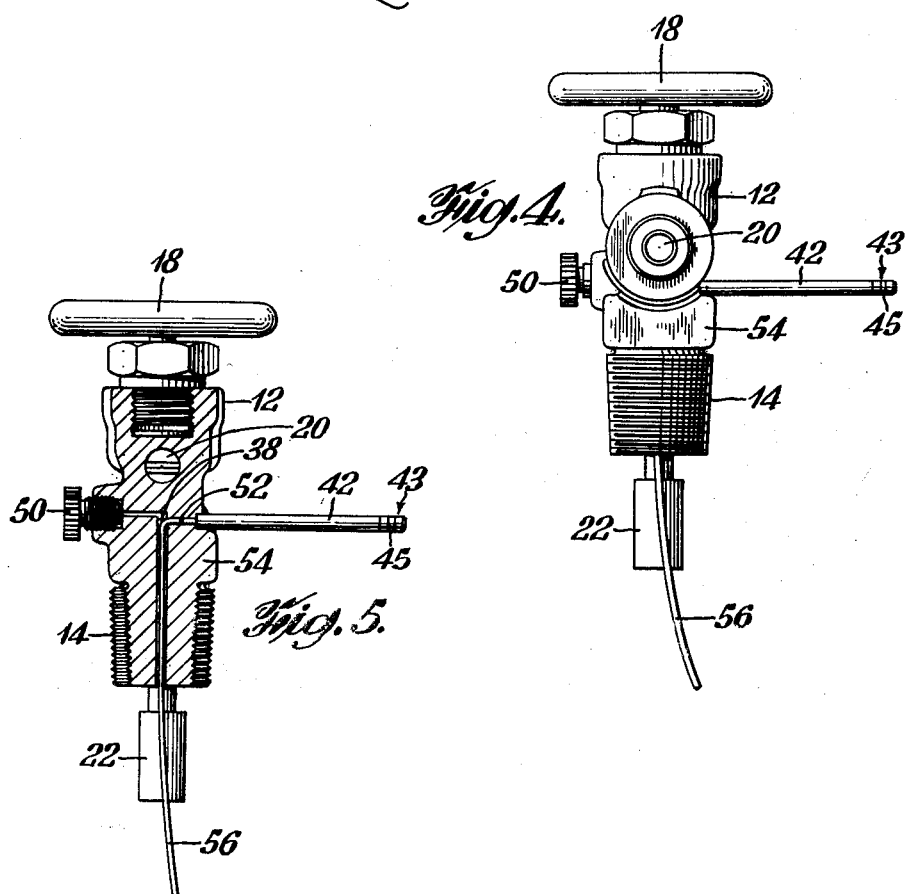
INVENTORS
GERARD C. FROST
JOHN P. GRYNKIEWICZ
ATTORNEY

United States Patent Office 3,188,865
Patented June 15, 1965

3,188,865
INTEGRATED APPARATUS FOR MEASURING
THE LEVEL OF LIQUIDS
Gerard C. Frost, Mohegan Lake, and John P. Grynkiewicz, Croton-on-Hudson, N.Y., assignors, by mesne assignments, to Pyrofax Gas Corporation, a corporation of Delaware
Filed Aug. 1, 1962, Ser. No. 213,927
6 Claims. (Cl. 73—304)

This invention relates to a device for measuring the level of dielectric fluids stored in a container and more particularly to an integrated device which forms an accessory part of the storage container.

Liquefiable gases such as the liquefied petroleum gases (L.P.G.) propane, butane, etc., are presently stored in containers in the liquid state. The gas is drawn from the storage container as a vapor or liquid for ultimate use. One major problem has been to determine the quantity of liquid remaining in the container after it has been in service for a period of time.

Accordingly, it is the object of this invention to provide a unit which is conveniently made an accessory part of the storage container and indicates the level of liquid in such container.

Another object is to provide an integrated apparatus which has universal applicability to all containers storing a dielectric liquid.

More specific objects are to provide a unit adaptable to liquefied petroleum gas cylinders, and to provide an integrated unit including a fixed liquid level tube.

These and other objects will become apparent from the following description and drawings in which:

FIGURE 3 is an exploded view partially in vertical section of the upper portion of the apparatus of the invention;

FIGURE 4 is a modification of the apparatus in FIGURE 2; and

FIGURE 5 is a section view of the apparatus in FIGURE 4.

The objects of the invention are accomplished in a general way by a unit which includes a valve having one side which communicates with the interior of a storage container and another side communicating with the atmosphere. In liquefied petroleum gas cylinders such valves have a liquefiable gas inlet through which the cylinder is charged and this same inlet serves as a vapor outlet when withdrawing gas from the cylinder. A first elongated electrically conductive element is attached to the valve at the side communicating with the interior of the cylinder and extends into the liquid the level of which is to be indicated. The elongated conductive element and the valve body forms one "plate" of a capacitor. A second elongated electrically conductive element forming the other "plate" of the capacitor has a first portion extending into the liquid the level of which is to be indicated. Such portion is adjacently disposed to the first conductive element so as to define a space therebetween. The liquid the level of which is to be measured forms part of the dielectric material between the first and second electrically conductive elements. Other materials contributing to the dielectric include the vapor phase of the liquid stored and any insulating material surrounding the second elongated element. Such second conductive element has a second portion surrounded by a flexible electrically insulating material and this portion extends beyond the first conductive element through the valve body to the side of the valve communicating with the atmosphere. The extremity of this second portion extends beyond the valve and is joined to an electrical connection means which is adapted to be connected into an appropriate electrical indicating means. When the electrical connection is made a circuit is established which includes the valve.

While the present invention has applicability to all types storage containers for non-conducting fluids such as, for example, tanks, trucks, etc., the description will be confined to cylinders for storing liquefied petroleum gas.

Liquefiable petroleum gas cylinders charged by volume, by requirement of the National Fire Protection Association (NFPA-58-B-18(b) 1961), must have a fixed liquid level gauge. This gauge provides a means of indicating when the cylinder is charged to the maximum allowable filling level. Thus, in the preferred embodiment described hereinbelow, the unit discussed is provided with a fixed liquid level gauge.

Figure 1:
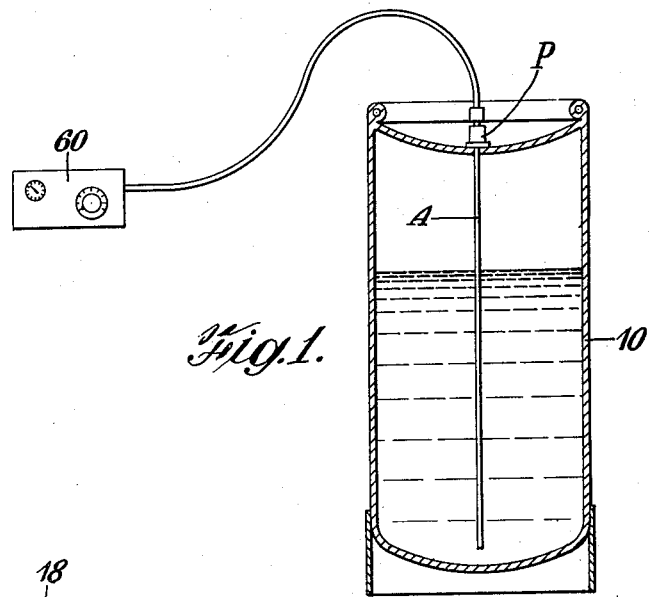
FIGURE 1 is a schematic of the unit of the invention forming part of a liquefied petroleum gas cylinder.

Referring now to the drawings, and specifically to FIGURE 1, a storage container 10 for storing a non-conducting liquefiable fluid such as propane has engaged in the head thereof the unit P of the invention. The probe assembly A extends downwardly with its lower end terminating immediately above the container floor so that the probe is always submerged in the fluid stored in the container 10.

Figure 2:
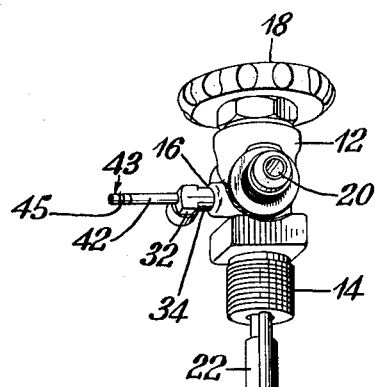
FIGURE 2 is a perspective view of the preferred embodiment of the invention.
Figure 2:
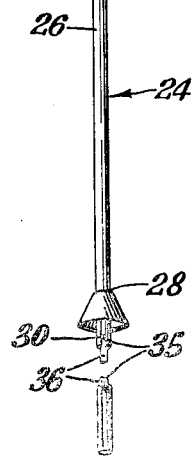

Referring to FIGURE 2, the preferred embodiment of the unit of the invention is provided with a valve body 12 having an interior side 14 adapted to be connected to the container 10 and another side 16 which communicates with the atmosphere. This side is provided with a valve handle 18 for opening and closing liquid inlet and vapor outlet 20. Inlet-outlet 20 communicates through the valve body 12 with filling tube 22 which has a check-valve (not shown) provided therein. The probe assembly 24 in this embodiment includes a fixed liquid level gauge 26 which is attached to the interior side 14 of the valve 12. The length of the fixed liquid level gauge 26 is determined by design to indicate the maximum level to which the container may be charged for the product contained. The design criteria are set forth by the National Fire Protection Association in Pamphlet 58 Rule B.18(F) in the May 1961 edition. Attached to the lower end 28 of the fixed liquid level gauge, as for example by soldering, is an outer electrically conductive tubular member 30 made, for example, from brass. The connection between the tubular member 30 and the fixed liquid level gauge 26 is made so that there remains an annular space through which vapor may rise and pass out through the valve body 12 and bleed valve 32 provided at the atmosphere side 16 of the valve 12. The bleeder valve 32 is connected to the valve 12 through the T connection 34. Upon charging the container 10, when the level in the container reaches the lower end 28 of the fixed liquid level gauge 26, liquid will pass up the gauge tube and out the bleed valve 32 through bleed valve vent 33 (see FIG. 3) when the bleed valve 32 is open. Escaping liquid indicates that the container is full to the maximum allowable limit. The tubular member 30 preferably is provided along its entire length with a narrow slot 35. The slot preferably has a width of about 1/16 inch. The slot is provided to ensure that the dielectric liquid level in contact with an electrically conductive element 36 positioned within but radially spaced from the tubular member 30 is the same as the level in the cylinder. Also, the slot prevents liquid from entering the fixed liquid level gauge 26 until the liquid reaches the maximum allowable filling level. In this case the element 36 is made, preferably, of silver coated copper strands covered with a Teflon liner. However, it could be a bare conductive element provided it is not electrically connected to the tubular member 30. The tubular member 30, the fixed liquid level gauge 26, and the valve body 12 form one "plate" of the capacitance level type gauge.

The valve body 12 is provided with a channel 38 (See FIG. 3) through which passes the upper portion 36' of the element 36. This upper portion 36' must be surrounded by an electrically insulating material. The upper portion 36' may be surrounded by the electrically insulating material, by for example, coating the portion 36' or by coating the channel 38 with the material. Such material must be a flexible material and is preferably Teflon or equivalent material. The element 36 forms the second "plate" of the capacitance type level gauge and therefore must be at all times electrically isolated from the valve body and cylinder shell. The extremity 41 of the insulated upper portion 36' extends through the T connection 34 and is surrounded by a tubular member 42. The extremity 41 is connected to an electrical connector 43 which also makes electrical connection with member 42 and thus the valve body 12 and the tubular member 30. Although the connector 43 makes electrical connection with each side of the capacitor, such sides are electrically isolated by insulation plug 45. A portable electrical measuring meter 60 (See FIG. 1) can then be attached to connector 43 thus making the variable capacitor formed by the valve body 12, tubular memer 30, conductive element 36, and dielectric liquids in the container part of the circuit wherein any variation in capacitance can be read as a direct measure of the quantity of liquid in the container.

The modification of the invention shown in FIGURES 4 and 5 differs from the preferred embodiment in that the bleed valve 50 is located separately from the extremity 52 of the conductive element 56. In FIGURE 5, it can be seen that the conductive element 56 extends beyond the valve body 54 on one side of the upper portion thereof while the bleed valve 50 is located on another side. Everything else in this modification remains the same.

Although the invention has been described in connection with the preferred embodiment, it is to be understood that certain variations in the parts of the apparatus may be made without departing from the spirit of the invention. For example, the liquid level gauge and probe assembly can be made as one piece with the slotted portion beginning at the appropriate point thereon such that the fixed liquid level gauge has the length determined from the requirements of the National Fire Protection Association.

What is claimed is:

1. Apparatus for indicating the level of a dielectric non-conducting liquid stored in a container comprising a metal valve body that fits over an opening in one side of a container with one side of the valve body communicating with the interior of said container and another side communicating with the atmosphere outside of the container; a first elongated electrically conductive element forming one "plate" of a capacitor and attached to the side of said valve body communicating with the interior of the container and extending into the liquid the level of which is to be indicated; a second elongated electrically conductive element forming the other "plate" of the capacitor and having a first portion extending into liquid the level of which is to be indicated and having such portion supported from the valve body adjacently disposed to said first electrically conductive element to define a space therebetween wherein the nonconducting liquid constitutes part of the dielectric material between said electrically conductive elements, and having a second portion extending through said valve body from the side communicating with the interior of the container to the side communicating with the atmosphere, the extremity of said second portion extending beyond said valve body, and the second portion being surrounded with a flexible electrically insulating material where it passes through the valve body to insulate said second portion from the metal of the valve body, electrical connection means provided at said extremity, and electrical indicating means adapted to be connected to said electrical connection means and with the value body for establishing a circuit including the first and second electrically conductive elements with the dielectric fluid therebetween as a variable capacitor whereby the variation in capacitance is read on said indicating means as a measure of the quantity of liquid in said container.

2. Apparatus for indicating the level of a dielectric liquid stored in a container comprising a valve body having an inner side communicating with the interior of said container and the other side communicating with the atmosphere; a first elongated tubular electrically conductive element attached to the inner side of the valve body and extending into the dielectric liquid stored in said container forming one "plate" of a capacitor; a second elongated electrically conductive element forming the other "plate" of the capacitor having a first portion positioned within and radially spaced from said tubular element and having a second portion surrounded with flexible electric insulating material extending beyond said tubular element and through said valve body to the side thereof communicating with the atmosphere the extremity of said second portion extending beyond said valve body; an electrical connection on the valve body and extending therefrom on the same side of said second portion and surrounding said second portion, the connection having different portions of its length insulated from one another including an inner portion electrically connected with the first elongated element and an outer portion electrically connected with said second portion of the second elongated element, and electrical indicating means adapted to be connected to said connection for establishing a circuit including said capacitor whereby the variation in capacitance in said circuit is read on said indicating means as a measure of the quantity of liquid in said container.

3. Apparatus for indicating the level of liquefied petroleum gases stored in a container comprising a valve body having one side communicating with the interior of said container and the other side communicating with the atmosphere; a bleed valve provided on said valve body on the atmosphere side thereof; a fixed liquid level gauge connected at the top side thereof to the interior side of said valve body, and having a passage through which the gauge communicates with said bleed valve for indicating when the container is charged to the maximum allowable level; a first elongated electrically conductive element forming one "plate" of a capacitor connected to the bottom side of said fixed liquid level gauge, said first elongated electrically conductive element being provided with a slot along its entire length and such element extending into the liquid the level of which is to be indicated; a second elongated electrically conductive element forming the other "plate" of the capacitor and having a first portion adjacently disposed to said first electrically conductive element to define a space therebetween wherein the liquefied petroleum gas forms part of the dielectric material between said electrically conductive element and said second elongated electrically conductive element having a second portion surrounded with a flexible electrically insulating material extending through at least a portion of the length of said passage from the side communicating with the interior of the container to the bleed valve provided on the atmosphere side of said valve body; the extremity of said second portion extending beyond said bleed valve and being provided with electrical connection means; and electrical indicating means adapted to be connected to said electrical connection means thereby establishing a circuit including the first and second electrically conductive elements with the liquefiable petroleum gas therebetween as a variable capacitor whereby any variation in capacitance is read on said indicating means as a measure of the quantity of liquid in said container.

4. Apparatus according to claim 5 wherein the portion of said second elongated electrically conductive element surrounded with a flexible electrically insulating material extends through said valve body from the side thereof communicating with said container to the atmosphere side of said valve body, the extremity of said portion extending beyond said valve at a location other than the location of said bleed valve.

5. Apparatus for indicating the level of liquefiable petroleum gases stored in a container comprising a valve body having one side communicating with the interior of said container and the other side communicating with the atmosphere; a bleed valve provided on said valve body on the atmosphere side thereof; a fixed liquid level gauge connected at the top side thereof to the interior side of said valve body, said gauge having a passage through which the gauge communicates with said bleed valve for indicating when the container is charged to the maximum allowable level; an elongated tubular electrically conductive element forming one "plate" of a capacitor connected to the bottom side of said fixed liquid level gauge, said elongated tubular electrical conductive element being provided with a slot along its entire length and such element extending into the liquid the level of which is to be indicated; a second elongated electrically conductive element forming the other "plate" of the capacitor and having a first portion adjacently disposed to said elongated tubular electrically conductive element to define a space therebetween wherein the liquefied petroleum gas forms part of the dielectric material between said tubular conductive element and said second elongated electrically conductive element, and said second elongated electrically conductive element having a second portion extending through at least a portion of the length of said passage from the side communicating with the interior of the container to the bleed valve provided on the atmosphere side of said valve body; both said first and said second portions of said second elongated electrically conductive element being covered with a flexible electrically insulating material; the extremity of said second portion extending beyond said bleed valve and being provided with electrical connection means; and electrical indicating means adapted to be connected to said electrical connection means thereby establishing a circuit including the tubular conductive element and the second conductive element with the liquefied petroleum gas therebetween as a variable capacitor whereby any variation in capacitance is read on said indicating means as a measure of the quantity of liquid in said container.

6. The apparatus described in claim 1 characterized by the first elongated element being made of brass, the second elongated element being a copper wire, and the insulating material on the second portion of the second elongated element being Teflon.

References Cited by the Examiner

UNITED STATES PATENTS

| | | | |
|---|---|---|---|
| 2,852,937 | 9/58 | Maze | 73—304 |
| 2,938,383 | 5/60 | Blackburn | 73—304 |
| 2,941,403 | 6/60 | Steenfeld | 73—304 |

FOREIGN PATENTS

| | | |
|---|---|---|
| 803,099 | 3/56 | Great Britain. |

OTHER REFERENCES

"Low-Temperature Liquid-Level Indicator," Published by National Bureau of Standards, Technical News Bulletin, January 1954 (pages 3 and 4 relied on).

ISAAC LISANN, *Primary Examiner.*